United States Patent [19]

Karlin

[11] 4,177,501

[45] Dec. 4, 1979

[54] ILLUMINATED KEYBOARD

[75] Inventor: James H. Karlin, Fairport, N.Y.

[73] Assignee: Harris Corporation, Cleveland, Ohio

[21] Appl. No.: 851,694

[22] Filed: Nov. 15, 1977

[51] Int. Cl.[2] .................................... G01D 11/28

[52] U.S. Cl. .................................... 362/26; 362/28; 362/30; 362/31; 362/32

[58] Field of Search .................... 362/23, 26, 27, 28, 362/29, 30, 31, 32; 340/365 R, 365 P, 365 E, 365 S, 365 L

[56] References Cited

U.S. PATENT DOCUMENTS

| | | | |
|---|---|---|---|
| 2,831,453 | 4/1958 | Hardesty | 362/26 |
| 3,491,245 | 1/1970 | Hardesty | 362/26 |
| 3,619,591 | 11/1971 | Korski | 362/32 |
| 3,619,594 | 11/1971 | Morez | 362/32 X |
| 3,752,974 | 8/1973 | Baker et al. | 362/31 |
| 3,886,544 | 4/1975 | Narodny | 362/32 |
| 3,892,959 | 7/1975 | Pulles | 362/31 |
| 3,956,745 | 5/1976 | Ellis | 340/365 R |

*Primary Examiner*—Peter A. Nelson

*Attorney, Agent, or Firm*—Craig and Antonelli

[57] ABSTRACT

An illuminating arrangement utilizes a sheet-type light-pipe. Light is reflected upwardly to the areas to be illuminated by providing the light-pipe with selectively roughened portions on its rear surface. When utilized to illuminate instruments such as calculators, surface areas of the calculator such as the pushbuttons and associated graphics receive light from the light-pipe by providing apertures in the keyboard which correspond positionally to the roughened portions of the sheet-type light-pipe. Additionally, the pushbuttons can be retained within the frame of the calculator by providing flanges extending laterally from the pushbuttons which are retained within apertures in a frame-like cover by retaining elements which extend from the cover inwardly into the openings.

23 Claims, 4 Drawing Figures

ILLUMINATED KEYBOARD

BACKGROUND AND SUMMARY OF THE INVENTION

This invention relates to an improved illuminating arrangement for instrument panels and pushbuttons, such as found on calculators, telephones, and numerous other pushbutton and non-pushbutton displays. More particularly, the present invention relates to an improved illuminating arrangement of the type using the technique of edge illumination of transparent plastics. The present invention also relates to improved pushbutton retention arrangements for use in illuminated arrays.

It has been long known to utilize solids which diffuse light rays in illuminating arrangements by bringing only a fragment of the surface of such a solid into proximity with a light source so as to illuminate the entire solid as well as to facilitate the transfer of light from the solid to closely positioned indicia or other components which are desired to be illuminated. However, in those instances wherein the light is desired to be transmitted from the light diffusing solid to one or more other components, such as the pushbuttons of an instrument, the prior art arrangements have required that either one surface be coated or joined to a material, such as mirror silver, so as to deflect the light rays towards the other areas to be illuminated, or the other areas or elements had to be brought into the direct path of the light through the light diffusing solid.

U.S. Pat. Nos. 2,831,453; 3,135,470; and 3,892,959 are representative of the first-mentioned type of edge-lit display wherein reflective coatings or backings are applied to the rear of a transport sheet for the purpose of deflecting light outwardly through the frontal surface, while U.S. Pat Nos. 2,476,257; 3,144,643; 3,213,269 and 3,645,227 are representative of the latter-mentioned arrangement wherein illumination is achieved by placing the element to be illuminated in the direct path of light from the light source.

Accordingly, it is an object of this invention to provide an illuminating arrangement which utilizes a light diffusing sheet-type light-pipe, but does not require the use of reflective material or the imposition of components within the direct light path for illuminating various components and graphics.

It is a further object of this invention to provide an improved arrangement which optimizes the illumination achieved in pushbutton type devices, such as calculators and the like.

It is still a further object of this invention to achieve the above-noted improvements in a manner that provides a high degree of flexibility in adapting a single arrangement to a number of different formats.

In accordance with the present invention, a convenient low cost illuminating arrangement is achieved in the context of pushbutton devices, such as calculators, through the use of an edge-lit light-pipe sheet which has portions of its rear surface selectively roughened, such as by etching, so as to deflect light through its front surface to graphics and pushbuttons which are sought to be illuminated. Improved illumination of the pushbuttons is acheived in a preferred embodiment by providing the pushbuttons with laterally extending flanges, while improved graphics illumination is facilitated by providing apertures through these flanges such that light from the light-pipe can directly impinge upon the graphics while illuminating the pushbuttons via diffusion. To prevent obstruction of the light passing to the graphics and/or increase the illuminated area about the pushbuttons, the pushbuttons are held within their operation openings by retaining means engaging only corners of the flanges.

The above and other objects and features of the present invention will be apparent to those of ordinary skill in the art from the following detailed description when considered in connection with the accompanying drawings which show, for purposes of illustration only, several embodiments in accordance with the present invention.

DETAILED DESCRIPTION OF THE DRAWINGS

DETAILED DESCRIPTION OF THE INVENTION

Figure 1:
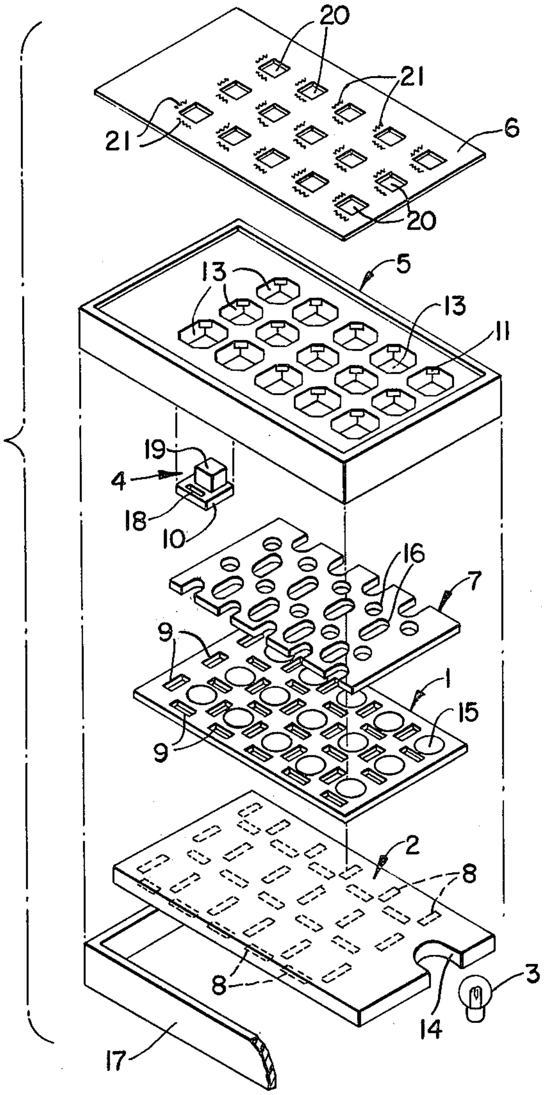
FIG. 1 is an exploded isometric view of a calculator employing the improved features according to the present invention with portions thereof deleted for simplicity.

As can be seen from FIG. 1, the concepts according to the present invention can be applied to achieve a low cost, high volume, illuminated calculator. Such as calculator culd utilize a conventional disk-type calculator keyboard 1 which is placed on the top surface of a light-pipe 2, which may be comprised of an acrylic, polycarbonate, or other appropriate light transmitting material.

Figure 3:
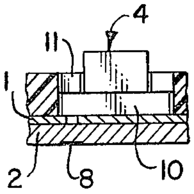
FIG. 3 is a partial cross-sectional view of a cover and pushbutton, taken along line I—I of FIG. 2, illustrating a first manner by which the pushbuttons may be retained within the cover.

Illumination can be achieved by any conventional light source 3, which is represented by a light bulb in FIG. 1, by placing the light source 3 adjacent an edge of the light-pipe 2, and for example, may be provided within a recess 14 in one end thereof. The light-pipe 2, and the light source 3 are received within the bottom member 17, and upward deflection of light from the light source 3 through the upper surface of the light-pipe 2 is achieved, according to a first feature of the invention, by providing the lower or rear surface of the light-pipe 2 with roughened or disturbed areas 8 (FIGS. 1 and 3).

As previously noted, a conventional calculator keyboard 1 is placed on the top surface of the light-pipe 2. To facilitate the transfer of light from the light-pipe 2 through the keyboard 1, the keyboard 1 is provided with apertures 9 which can be formed as slots or holes in the keyboard 1 by punching or routing areas surrounding the disks 15 of the keyboard 1. In those applications wherein the unit is or may be subjected to a high degree of vibration, a rattle-free arrangement can be achieved by utilizing an optional die cut foam pad 7. Like the keyboard 1, the foam pad 7 is provided with openings 16 which are cut therein at appropriate locations so as to enable light travelling upwardly from the light-pipe 2 to pass therethrough after leaving the apertures 9 of the keyboard 1.

Figure 2:
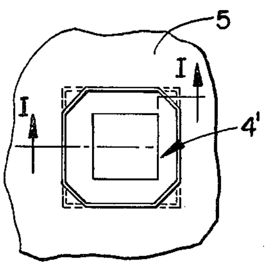
FIG. 2 is a partial elevational view showing a pushbutton received within an opening of the cover.

Additionally, pushbuttons 4 (only one being shown for purposes of simplicity) are held in position above the calculator keyboard 1 by a frame-like cover 5. As can be seen from FIG. 1 and 2, the pushbuttons 4 have an upstanding pushbutton key top 19 which is surrounded at its base by laterally extending flanges 10 within which apertures such as 18 can be provided for reasons to be discussed in greater detail later. The pushbuttons 4 of the above-noted construction are received within a plurality of apertures 13 in the cover 5. The apertures 13 have a square cross-section corresponding to that of the flanges 10 of the pushbuttons 4 through their height, except the upper end thereof wherein provisions is made for retaining the pushbuttons within the case formed by the cover 5 in conjunction with the bottom 17. The pushbuttons are retained by extension flanges 11 located in the corners of the openings 13, and which may suitably form a 45° angle with respect to the sides of the openings 13.

Mounted to the upper surface of the frame 5 is a die cut label 6 which may be provided with an adhesive backing for bonding the label 6 to the upper surface of the cover 5. Openings 20 are cut into the label at positions corresponding to the openings 13 in the cover 5 so as to receive the pushbutton key tops 19 which extend upwardly from the cover 5 through the apertures 13. The label 6 will normally be provided with appropriate graphics, i.e., letters, words, or symbols, representative of the function achieved by pressing of a particular pushbutton, in a manner to be described more fully herein, by forming the graphic representations 21 as translucent or transparent areas of the label 6.

Figure 4:
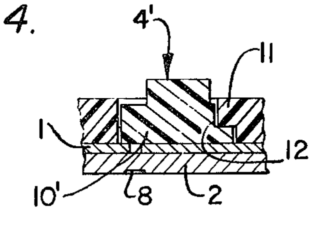
FIG. 4 is a partial cross-sectional view, also taken along line I—I of FIG. 2, illustrating a second manner in which the pushbuttons can be retained within the cover.

According to a first pushbutton arrangement as shown in FIG. 3, the pushbuttons 4 are retained by the extension flanges 11 engaging the top surface of the corners of the pushbutton flanges 10. However, in a modified arrangement, as illustrated in FIG. 4, the upper surfaces of the pushbutton flanges are retained at a level substantially in line with the surface of the cover 5 for the purpose of improving the illumination of graphics 21 contained on the label 6. This positioning can be achieved by providing the pushbutton 4' with flanges 10' (which are thicker than flanges 10) having a recess or notch 12 at points positionally corresponding to the retaining flanges 11 so as to receive the retaining flanges 11 therein. Furthermore, the illumination of label graphics 21 can be further improved by the provision of one or more appropriately positioned apertures 18 (FIG. 1) within the flanges of the pushbuttons 4, 4' so that light may pass through the apertures 18 to illuminate the graphics 21 upon the label as well as diffuse through the pushbuttons 4, 4', which pushbuttons are formed from a translucent material.

As can be seen from FIG. 1, a further feature of the invention includes forming two of the flanges 10 on adjacent sides of the pushbutton 4 so as to extend laterally a greater distance than the flanges 10 on the other two sides of the rectangular pushbutton 4, or if the flanges 10 are formed as a unitary base from which the pushbutton key top 19 extends as an integral formation, then the pushbutton key top 19 would be formed off center with respect to the flange forming base so as to form the different sized pair of flanges 10. This pushbutton design permits positioning of the pushbuttons 4, 4' in either of two 90° shifted positions so that a single pushbutton 4, 4' can be used in either horizontal or vertical formats having corresponding label legends. Thus, the additional costs attendant to having to manufacture two different sets of pushbuttons (one for vertical and one for horizontal displays) can be avoided.

As previously noted, the lower or rear surface of the light-pipe 2 is provided with roughened or disturbed areas 8. These roughened or disturbed areas (one of which is shown in cross-section in FIG. 3) can be achieved by a chemical etching of selected portions of the rear light-pipe surface or, in the case where the light-pipe is formed by injection or transfer molding, suitable shaping surfaces of the mold can be etched to produce corresponding disturbed areas on the light-pipe. In this regard, it is noted that no particular manner of etching is required, the only requirement being that the effect of the etching process should produce areas upon the rear surface of light-pipe 2 which are disturbed or roughened so as no longer to be smooth. In addition, where high production rates are not a factor, the disturbed areas can be produced by appropriate machining of selected areas of the rear surface of the light-pipe 2 for directing the light to the desired area for illumination.

As can be appreciated from the above descriptions of the present invention, light from the light source 3 will be diffused through the light-pipe due to the positioning of the light source within the recess 14. Due to the presence of disturbed areas 8 upon the rear surface of the light-pipe 2 (at, for example, the positions represented in FIG. 1), light from the light source 3 will be deflected upwardly at these areas so as to pass through the apertures 9 in the keyboard 1 (and optionally through the apertures 16 in the foam pad 7) through the flanges 10, 10' of the pushbuttons 4, 4', such that the translucent pushbuttons are illuminated thereby. The light may also travel through one or more apertures 18 in the flanges 10, 10' so as to illuminate graphics 21 on the label 6 immediately thereabove, or may merely diffuse through the flanges 10, 10' to illuminate the graphics 21. Thus, an illuminating arrangement which provides a low cost, high volume illumination arrangement for calculators and various other pushbutton apparatus has been demonstrated which is similarly applicable for use in various non-pushbutton environments. Furthermore, while a specific preferred embodiment, along with several modifications thereto, has been described in detail, it will be apparent to those of ordinary skill in the art that various other modifications could be made within the scope of the present invention. For example, retention means for the pushbuttons can be provided at points other than the corners or so as to form angles other than 45°, and these retention elements need not be flanges formed as part of the cover surface but could be separate elements joined thereto. Additionally, the pushbuttons need not be rectangular, and when the invention is embodied in a calculator, the keyboard need not be of the disk type.

Therefore, since other and still further modifications will be apparent to those of ordinary skill in the art, the present invention should not be viewed as limited to those embodiments disclosed herein but is only limited by the scope of the appended claims.

I claim:

1. An illuminating arrangement comprising:

light-pipe means formed of a light transmitting material having front and rear surfaces, a light source means for edge-lighting said light-pipe means, and surface means for deflecting light from said light source through said front surface comprising roughened portions of said rear surface.

2. An illuminating arrangement according to claim 1, wherein said roughened portions are etched areas on said rear surface.

3. An illuminating arrangement according to claim 2, wherein said light-pipe means is positioned within an instrument to be illuminated and said roughened portions positionally correspond with portions of said instrument sought to be illuminated.

4. An illuminating arrangement according to claim 3, wherein said instrument is a calculator, said instrument portions include pushbutton means, and a calculator keyboard is interposed between said pushbuttons and said light-pipe means.

5. An illuminating arrangement according to claim 1, wherein said light source means is positioned adjacent an edge of said light-pipe means.

6. A pushbutton illuminating arrangement comprising:

at least one pushbutton formed of light transmitting material, frame means for receiving said at least one pushbutton and a light source mounted to the rear of said at least one pushbutton, wherein said frame means is provided with at least one opening receiving said at least one pushbutton, said at least one pushbutton having flange means of light transmitting material extending laterally therefrom, and wherein said at least one opening is provided with retaining means therein for retaining said pushbutton within said frame means by engaging portions of said flange means in a manner that permits light from said light source to pass through non-retained portions of said flange means outwardly between wall surfaces of said at least one opening and said at least one pushbutton, whereby light from said light source is emitted from both said at least one pushbutton and said flange means.

7. A pushbutton illuminating arrangement according to claim 6, wherein said flange means is received within said opening and said retaining means are formed by flanges extending from said frame means into said at least one opening at an outer end thereof.

8. A pushbutton illuminating arrangement according to claim 7, wherein said at least one opening is rectangular and said flanges are located in corners thereof.

9. A pushbutton illuminating arrangement according to claim 8, wherein said flanges extending from said frame form a 45° angle with respect to sides of said opening.

10. A pushbutton illuminating arrangement according to claim 6, wherein said at least one pushbutton is rectangular and said flange means includes first and second portions extending from first and second sides of said pushbutton a first distance and third and fourth portions extending from third and fourth sides of said pushbutton a second distance, said first distance being greater than said second distance.

11. A pushbutton illuminating arrangement according to claim 10, wherein at least one of said first and second flange means portions has an aperture extending therethrough.

12. A pushbutton illuminating arrangement according to claim 10, wherein said first and second portions are on adjacent sides of said at least one pushbutton.

13. A pushbutton illuminating arrangement according to claim 6, further comprising; light-pipe means formed of light transmitting material having front and rear surfaces positioned rearwardly of said at least one pushbutton, said light source being positioned adjacent a side of said light-pipe means, and surface means for deflecting light from said light source through said front surface of said light-pipe means comprising roughened portions of said rear surface of said light-pipe means.

14. A pushbutton illuminating arrangement according to claim 13, wherein said roughened portions are mechanically disturbed areas.

15. A pushbutton illuminating arrangement according to claim 13, wherin said roughened portins are etched areas on said rear surface of said light-pipe means.

16. A pushbutton illuminating arrangement according to claim 13, wherein said frame means constitutes at least a portion of a calculator, and said roughened portions positionally correspond with portions of said calculator sought to be illuminated.

17. A pushbutton illuminating arrangement according to claim 16, wherein said calculator portions include at least one pushbutton and associated graphics, and a calculator keyboard is interposed between said pushbuttons and said light-pipe means, said calculator keyboard being provided with means facilitating the transfer of light from said light-pipe means to said pushbuttons.

18. A pushbutton illuminating arrangement according to claim 17, wherein said means facilitating the transfer of light comprises apertures in said keyboard corresponding positionally to said roughened areas.

19. A pushbutton illuminating arrangement according to claim 15, wherein said frame means constitutes at least a portion of a calculator, and said roughened portions positionally correspond with portions of said calculator sought to be illuminated.

20. A pushbutton illuminating arrangement according to claim 19, wherein said calculator portions include said at least one pushbutton and associated graphics, and a calculator keyboard is interposed between said pushbuttons and said light-pipe means, said calculator keyboard being provided with means facilitating the transfer of light from said light-pipe means to said pushbuttons.

21. A pushbutton illuminating arrangement according to claim 20, wherein said means facilitating the transfer of light comprises apertures in said keyboard corresponding positionally to said roughened areas.

22. A pushbutton illuminating arrangement according to claim 7, wherein said flange means is provided with recesses for receiving said retaining means flanges, thereby enabling said flange means to be positioned adjacent said outer end of said at least one opening.

23. A pushbutton illuminating arrangement according to claim 17, further comprising a foam pad interposed between said at least one pushbutton and said keyboard, so as to minimize rattling in high vibration environments.

* * * * *